United States Patent Office 3,372,195
Patented Mar. 5, 1968

3,372,195
REDUCTION OF NITRILES TO PRIMARY AMINES
John C. Little, Midland, Mich., assignor to The Dow Chemical Company, Midland, Mich., a corporation of Delaware
No Drawing. Filed May 4, 1964, Ser. No. 364,750
15 Claims. (Cl. 260—570.7)

ABSTRACT OF THE DISCLOSURE

Primary amines are made by hydrogenating a nitrile to its corresponding primary amine at a temperature between 0° and 200° C. and a pressure between 500 and 2000 p.s.i.g. wherein the reaction is carried out in the presence of at least 5 moles of ammonia per equivalent of nitrile and a catalytic amount of ruthenium.

---

This invention concerns the preparation of primary amines by the catalytic reduction of nitriles.

The preparation of primary amines from aliphatic nitriles can be accomplished by either chemical reduction or by catalytic hydrogenation. In commercial processes, the latter method is definitely preferred, from the standpoint of cost or ease of operation.

The presently preferred method of carrying out the catalytic reduction of nitriles to primary amines involves treatment of the nitrile with hydrogen and either a finely divided nickel, R. C. Fuson, Advanced Organic Chemistry, J. Wiley & Sons, New York, 1950, p. 255; R. B. W. Wagner and H. D. Zook, Synthetic Organic Chemistry, J. Wiley & Sons, New York, 1953, pp. 658–660; H. Adkins and R. L. Shriner in H. Gilman's Organic Chemistry, vol. I, 2d ed., J. Wiley & Sons, New York, 1943, pp. 809–810; V. Migrdichian, Organic Synthesis, vol. 1, Reinhold Publishing Co., New York, 1951, p. 439; or cobalt catalyst under high pressures and temperatures. Under these conditions, however, yields are often lowered by formation of considerable secondary amine; ibid.

It has now been discovered that alkyl, aryl, alkaryl and aralkyl nitriles, which may bear substituents inert under the reaction conditions, e.g., alkoxy, aryloxy, alcohol groups, can readily be hydrogenated to give high yields of the corresponding primary amine according to the general equation:

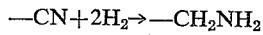

Preferred classes of nitrile starting materials are cyanoalkylated alcohols and amines, especially cyanomethylated and cyanoethylated alcohols and amines. Another preferred class of nitrile starting materials are cyanomethylated polyglycols and cyanoethylated polyglycol ethers. Examples of these and other nitrile starting materials are the following classes:

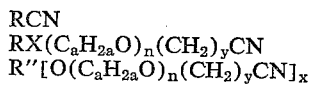

wherein R is a hydrocarbyl group, which may be aliphatic or aromatic, free of substituents reactive under the hydrogenation conditions. R may be straight or branched chain alkyl, cycloalkyl, aryl such as phenyl, naphthyl, substituted aryl, the substituting moieties being selected from alkyl, aryl, alkoxy, aryloxy and aralkyl; X is chosen from the group consisting of O and NR' where R' is one of H, $-(C_aH_{2a}O)_n(CH_2)_yCN$, $-(C_aH_{2a}O)_n$, $-R$, and R; $y$ is an integer from 1 to 3, and $n$ is an integer from 0 to about 100; R" is the residue of a polyhydroxy compound such as ethylene glycol, propylene glycol, glycerol, pentaerythritol, sugars, and carbohydrates wherein $x$-number of the hydroxy groups have been replaced by the moieties shown, $x$ being an integer from 1 to the total number of hydroxyl groups in said polyhydroxy compound; and $a$ is an integer from 2 to 4.

The hydrogenation with hydrogen or a hydrogen-containing gas is carried out in the presence of a catalytic amount of ruthenium catalyst, advantageously in the presence of a solvent inert under the reaction conditions. As solvents, there can be used water, alcohols such as methanol, ethanol, 1-propanol, 2-propanol, any of the butanols, or ether alcohols such as 2-methoxyethanol, 2-ethoxyethanol, 2-ethoxy-1-propanol, 2-(2-ethoxy)ethoxyethanol, ethers such as dimethoxymethane, diethoxymethane, dimethoxydiethylene glycol, ethyl ether, tetrahydrofuran, dioxane, tetra-amines such as trimethylamine, triethylamine, triethanolamine, N-methylpiperidine, and amides of lower fatty acids such as dimethylformamide. With nitriles having a lower molecular weight than about 200, water is not a preferred solvent due to its tendency to cause increased by-product formation.

The formation of by-products, especially secondary and tertiary amines, is still further suppressed by the use of reaction conditions which are conducive to rapid hydrogenation, thus to reduce the opportunity for the occurrence of such reactions. One set of preferred conditions comprises the use of dilute solutions of the starting nitrile, i.e., one normal or less, a reaction temperature between 50° and 200° C., preferably in the range of 100° C. to 150° C. and hydrogen pressures greater than about 50 p.s.i.g., preferably from 500 to 2000 p.s.i.g.

Formation of secondary and tertiary amine by-products may also be further suppressed by the use of some ammonia in the reaction mixture. While any amount of ammonia is useful, an amount of 5 to 20 moles of ammonia per molar equivalent of nitrile group is preferred. When ammonia is used, a reaction temperature of 0° to 200° C. is operable, while a range of 50° to 150° C. is preferred. The hydrogen pressure is not so critical as in the absence of ammonia; however, in order to obtain a practical rate of hydrogenation, a pressure of at least one atmosphere of hydrogen should be used, and preferably 500–2000 p.s.i.g. The reaction is normally complete in less than two hours.

Variations of concentration, temperature and pressure within the limits taught usually will produce an optimum reaction for a particular starting nitrile, such that the reaction is complete in from 10 to 40 minutes. Under such conditions, the maximum benefit of the invention is attained: a rapid reaction which gives a minimum of the secondary and tertiary amine by-products.

The active catalyst is finely divided ruthenium metal which is used as such or in the form of ruthenium oxide or a salt which is readily converted to finely divided ruthenium upon treatment with hydrogen or supported on a solid particulate support such as carbon or alumina. While any amount of catalyst is operable, hereinafter referred to sometimes as a "catalytic amount," a proportion of 0.01 to 50 g. ruthenium per gram equivalent of nitrile group is practicable while a proportion of 0.2 to 2.0 g. ruthenium per gram equivalent of nitrile group is preferred.

The process of this invention encompasses the specific nitriles disclosed as well as the groups and subgroups thereof obtainable from any permutation and combination thereof.

The following examples describe completely representative specific embodiments and the best mode contemplated by the inventor of carrying out the inventive process. They are not to be considered as limiting the invention other than as defined in the claims.

*Example 1*

To a 1-liter stainless steel autoclave was charged 0.5 mole of 3-methoxypropionitrile, 3 g. of 5 percent Ru/C catalyst, 300 ml. of dry methanol, and 85 g. of liquid ammonia. The autoclave was sealed and then pressured to 1000 p.s.i.g. with hydrogen. After heating over 30 minutes time to 125° C., the reaction mixture was maintained at 123°–127° C. for an additional 30 minutes, during which time the theoretical amount of hydrogen had been absorbed and the reaction had virtually ceased. The vessel was cooled and vented, the catalyst was filtered from solution, and the filter cake washed with 50 ml. of dry methanol. Distillation of the resulting filtrate gave 44.4 g. of material, B.P. 90–125° C., estimated to contain 38.3 g. (86 percent yield) of 3-methoxypropylamine by gas chromatographic analysis. Very little, if any, secondary amine was formed during the reaction, as determined by gas chromatography.

*Example 2*

The reduction of 3-ethoxypropionitrile was carried out in a manner similar to that described in Example 1 using 0.5 mole of the nitrile, 3 g. of 5 percent Ru/C catalyst, 300 ml. of dry methanol, and 85 g. of liquid ammonia. The reduction was carried out at 120°–125° C. and hydrogen adsorption was virtually complete after 22 minutes at the reaction temperature. After the autoclave was cooled, vented and the reaction mixture was filtered and distilled, a total of 43.9 g. (85 percent yield) of 3-ethoxypropylamine was obtained.

*Example 3*

The reduction of 3-ethoxypropionitrile was carried out essentially as described in Example 2 excepting that 300 ml. of absolute ethanol was used as solvent in place of anhydrous methanol. The yield of 3-ethoxypropylamine was 46.3 g. (90 percent).

*Example 4*

The reduction of 3-isopropoxypropionitrile was carried out essentially as described in Example 1; 0.376 mole of the nitrile, 2.3 g. of 5 percent Ru/C catalyst, 230 ml. of dry methanol, and 64 g. of liquid ammonia were charged to the autoclave. Hydrogen uptake was virtually complete after 15 minutes at 120°–127° C. Workup of the reaction mixture as above (some mechanical losses) yielded 31.5 g. of 3-isopropoxypropylamine (72 percent yield).

*Example 5*

To the 1-liter stainless steel autoclave was charged 61 g. (0.33 mole) of a crude sample of n-octyloxypropionitrile (obtained by addition of 1.0 mole of n-octyl alcohol to 1.25 moles of acrylonitrile in the presence of potassium hydroxide as a catalyst, followed by neutralization with acid and removal of the volatile material, 3 g. of 5 percent Ru/C catalyst, 200 ml. of dry methanol and 56.6 g. of liquid ammonia. The hydrogenation was carried out at 120°–125° C. and hydrogen absorption was virtually complete after 30 minutes. The autoclave was vented, and the contents filtered to remove the catalyst. The material was distilled to yield 56.2 g. (79 percent yield based on the octyl alcohol starting material for the cyanoethylation reaction) of 3-(octyloxy)propylamine, B.P. 72°–73° C./0.6 mm.

*Example 6*

To the autoclave was charged 70.4 g. of crude n-decyloxypropionitrile, 3.0 g. 5 percent Ru/C, 200 ml. of dry methanol, and 56.6 g. of liquid ammonia. Hydrogenation as above at 124°–125° C. at 1440–1700 p.s.i.g. for one hour resulted in uptake of the theoretical amount of hydrogen. The reaction mixture was worked up as above to yield 3-(decyloxy)propylamine, B.P. 93.5°–95° C./0.4–0.5 mm. (81 percent yield based on decyl alcohol used as starting material).

*Example 7*

Reduction of 207 g. of crude n-dodecyloxypropionitrile was carried out in the presence of 7.8 g. of 5 percent Ru/C catalyst and 147 g. liquid ammonia. Uptake of the theoretical amount of hydrogen at 120°–125° C. and 1400–1920 p.s.i.g. was virtually complete after one hour. The resultant reaction mixture was dissolved in methanol, filtered and distilled to yield 3-(n-dodecyloxy)propylamine, B.P. 120°–122° C./0.6–0.7 mm. (80 percent yield based on n-dodecyl alcohol used as starting material in the cyanoethylation reaction).

*Example 8*

To a 1-liter, stainless steel autoclave was charged 87 g. of a tris-(2-cyanoethyl ether of general Formula I below, having an average molecular weight of 425 (average of $x$, $y$ and $z=1$)

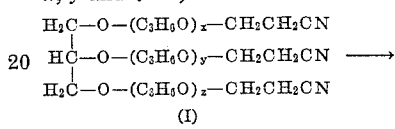

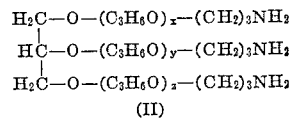

$x$, $y$ and $z=0$, 1, 2, 3, etc. which contained 0.085 meq./g. of OH as determined by phthalation. Also added was 80 g. of liquid ammonia, 100 g. of dry methanol and 10 g. of 5 percent Ru/C catalyst. Hydrogenation was carried out at 1000–1600 p.s.i.g. for one hour; however, absorption of hydrogen had virtually ceased after 0.5 hour. The autoclave was cooled, vented and the reaction mixture was filtered to remove the catalyst and concentrated to yield 73 g. (82 percent yield) of the corresponding triamine (II), having an average molecular weight of 437.

Analyses of this material and the products of the following examples were performed by first determining the total amine base present by a standard non-aqueous titration. The total secondary and tertiary amine was determined by a modification of the procedure of F. E. Critchfield and J. B. Johnson, Anal. Chem. 29, 1174 (1957), employing a 30-minute treatment at 60° C. with acetylacetone followed by titration to determine the remaining (unreactive) secondary and tertiary amine.

The hydroxyl analyses were only approximate and were calculated by assuming no change in the average molecular weight of the material other than the gain (4 hydrogens per nitrile group) during conversion to the amine. The total theoretical end groups were then calculated and the OH content was taken as the difference between this figure and the total amine by titration.

*Analysis.*—Calcd. for II ($x=y=z=1$)=$C_{21}H_{47}N_3O_6$: primary amino N as $NH_2$, 6.87 meq./g. Found: Total amine N, 6.52 meq./g.; secondary and tertiary amino N, 0.183 meq./g.; primary amino N (by difference), 6.34 meq./g.; OH (by difference), 0.35 meq./g.

The increase in hydroxyl was therefore about 0.27 meq./g., and the percentage of primary amino nitrogen of the total amine present was 97 percent.

*Example 9*

To a 1-liter, stainless steel autoclave was charged 100 g. of a cyanoethylated polypropylene oxide of general formula

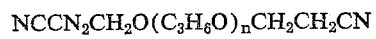

having an average molecular weight of 506 (average $n=6.6$) and containing 0.065 meq./g. of OH by phthalation. Also added were 100 g. of dry methanol, 68 g. of liquid ammonia, and 3 g. of 5 percent Ru/C catalyst. The material was hydrogenated at 125±2° C. for one hour at 1200–1700 p.s.i.g. hydrogen pressure, resulting in theoretical uptake of hydrogen. The autoclave was cooled, vented, and the product was filtered to remove the catalyst and then concentrated. A total of 95 g. (95 percent yield) of the bis-3-aminopropyl ether was obtained.

*Analysis.*—Calcd. for $$H_2NCH_2CH_2CH_2O(C_3H_6O)_{6.6}CH_2CH_2CH_2NH_2$$

primary amino N as $NH_2$, 3.98 meq./g. Found: Total amino N, 3.86 meq./g. Analysis of a similar material which was prepared in an identical manner showed the presence of 0.061 meq./g. of secondary and tertiary amino N. The primary amino N by difference is therefore 3.83 meq./g.; OH (by difference), 0.12 meq./g.

*Example 10*

To the autoclave was charged 150 g. of a cyanoethylated polyethylene oxide adduct of methanol of average formula $CH_3O(C_2H_4O)_{12}CH_2CH_2CN$, and average molecular weight of ca. 613, and containing 0.015–0.030 meq./g. of OH, 100 g. of dry methanol, 80 g. of liquid ammonia, and 5 g. of 5 percent Ru/C catalyst. The autoclave was pressured to 1000 p.s.i.g. with hydrogen at room temperature and then heated to $125\pm5°$ C. The hydrogen pressure was maintained at 1200–1800 p.s.i.g. until no further drop in pressure was observed (1 hour). The autoclave was then cooled, vented and opened, and the products were removed with the aid of methanol. After filtration to remove the catalyst, the volatile materials were removed in vacuo to yield 140 g. (93 percent yield) of a pale yellow oil.

*Analysis.*—Calcd. for $$CH_3O(C_2H_4O)_{12}(CH_2)_3NH_2=C_{20}H_{59}NO_{13}$$

primary and total N as $NH_2$, 1.62 meq./g. Found: Total amino N, 1.56 meq./g.; secondary and tertiary amino N, 0.014 meq./g.: primary amino N (by difference), 1.55 meq./g.; OH by difference 0.06 meq./g.

*Example 11*

To the autoclave was charged 106 g. of a cyanoethylated polypropylene oxide adduct of methanol of general formula $$CH_3O(C_3H_6O)_nCH_2CH_2CN$$

having an average molecular weight of 640 and an average $n=9.5$; amount of OH remaining=0.08 meq./g., 200 g. of 28 percent ammonium hydroxide, and 3 g. of 5 percent Ru/C catalyst. The autoclave was sealed and reduction was carried out at 123°–128° C. and 1400–1800 p.s.i.g. Hydrogen absorption was complete in 30 minutes. The autoclave was cooled, vented and the product was freed from catalyst by filtration. Evaporation of the solvent yielded 96.5 g. (91 percent yield) of the corresponding aminopropyl ether of general formula $$CH_3O(C_3H_6O)_nCH_2CH_2CH_2NH_2$$

having an average molecular weight of 644. Analyses were performed on a composite sample of several runs carried out in a manner identical to that described above.

*Analysis.*—Calcd. for $$CH_3O(C_3H_6O)_{9.5}CH_2CH_2CH_2NH_2$$

primary amino N as $NH_2$, 1.55 meq./g. Found: Total amino N, 1.49 meq./g.; secondary and tertiary amino N, 0.048 meq./g.; primary amino N (by difference), 1.44 meq./g.; OH (by difference), 0.06 meq./g.

*Example 12*

To the autoclave was charge 225 g. of a cyanoethylated polypropylene oxide of general formula $$NCCH_2CH_2O(C_3H_6O)_nCH_2CH_2CN$$

having an average molecular weight of 1294, an average $n$ of 20, and containing approximately 0.10 meq./g. of uncyanoethylated hydroxyl as determined by phthalation. Also added to the autoclave were 225 g. of 28 percent ammonium hydroxide and 5 g. of 5 percent Ru/C catalyst.

The autoclave was sealed and hydrogenation was carried out at 125° C. over one hour at 1400–1800 p.s.i.g.; hydrogen uptake was virtually complete in less than 30 minutes. The autoclave was then cooled, vented and the reaction mixture was diluted with methanol and filtered to remove the catalyst. Evaporation of the solvent yielded 210 g. (93 percent yield) of the corresponding bis-3-aminopropyl ether. Analyses were performed on a composite sample of several runs prepared in a manner identical to that described above.

*Analysis.*—Calcd. for $$H_2NCH_2CH_2CH_2O(C_3H_6O)_{20}CH_2CH_2CH_2NH_2$$

primary amino N, 1.537 meq./g. Found: Total amino N, 1.33 meq./g.; secondary and tertiary amino N, 0.040 meq./g.; primary amino N (by difference) 1.29 meq./g.; OH (by difference) 0.21 meq./g.

*Example 13*

To the autoclave was charged 150 g. of a cyanoethylated polypropylene oxide of general formula $$NCCH_2CH_2O(C_3H_6O)_nCH_2CH_2CN$$

having an average molecular weight of about 2136, and containing 0.088 meq./g. of uncyanoethylated hydroxyl as determined by phthalation. Also charged was 150 g. of 28 percent ammonium hydroxide and 3 g. of a 5 percent Ru/C catalyst. The autoclave was sealed and hydrogenation was effected at 122°–128° C. for one hour at 1400–1800 p.s.i.g. of hydrogen. The autoclave was then cooled, vented and the reaction mixture was diluted with methanol and filtered to remove the catalyst. Evaporation of the solvent yielded 148 g. (98.5 percent yield) of the polyether diamine of general formula $$H_2NCH_2CH_2CH_2O(C_3H_6O)_nCH_2CH_2CH_2NH_2$$

having an average molecular weight of about 2136 ($n$ averages 35). The material was a somewhat viscous, nearly colorless oil.

*Analysis.*—Calcd. for $$H_2NCH_2CH_2CH_2O(C_3H_6O)_{35}CH_2CH_2CH_2NH_2$$

primary amino N as $NH_2$, 0.933 meq./g. Found: Total amino N, 0.85 meq./g., secondary and tertiary amino N, 0.003 meq./g.; primary amino N (by difference), 0.85 meq./g.; OH (by difference) 0.08 meq./g.

*Example 14*

To the autoclave was charged 200 g. of n-dodecyloxypropionitrile (98 percent pure), 140 g. of liquid ammonia, 100 ml. of dry methanol, and 20 g. of 5 percent Ru/C catalyst. Uptake of hydrogen at 1000–1200 p.s.i g. was complete in less than half an hour at 100° C. Filtration and concentration of the resultant reaction mixture yielded 190 g. (93 percent yield) of 3-dodecyloxy)propylamine, containing 4.06 meq./g. of amine base by titration (theory 4.12 meq./g.).

*Example 15*

To the autoclave was added 200 g. of n-octadecyloxypropionitrile (98 percent pure), 100 g. of liquid ammonia, and 100 ml. of dry methanol and 18 g. of 5 percent Ru/C catalyst. The hydrogenation was carried out at 100° C. and 1000–1450 p.s.i.g. Hydrogen uptake was virtually completed in one hour. Filtration of the reaction product and removal of the volatile material gave 189 g. of white, crystalline 3-(n-octadecyloxy)propylamine (93 percent yield), which contained 3.02 meq./g. of total amine by titration (theory 3.06 meq./g.). The purity of the product was about 98 percent.

*Example 16*

To the autoclave was charged 105 g. of 2-(2-(tert.-octylphenoxy)ethoxy)propionitrile, 215 g. of 28 percent ammonium hydroxide and 14 g. of 5 percent Ru/C catalyst. The hydrogenation was carried out at 1000–1525 p.s.i.g. at 125° C. and was essentially completed in 20 minutes. After filtration and removal of the volatile materials, there was obtained 90 g. of 2-(2-(tert-octylphenoxy)ethoxy)propylamine as a pale amber liquid containing 2.74 meq./g. of primary amino nitrogen. No secondary or tertiary amino nitrogen could be detected.

*Example 17*

To the autoclave was added 200 g. of the 2-cyanoethyl ether of the adduct of nonylphenol with 2 moles of ethylene oxide, 250 g. of 28 percent ammonium hydroxide, and 16 g. of Ru/C catalyst. The hydrogenation was carried out at 125° C. and 1000–1400 p.s.i.g. Hydrogen uptake was essentially complete in 20 minutes. Filtration of the catalyst and removal of the volatile material yielded 178 g. of the 3-aminopropyl ether of the adduct of nonylphenol with 2 moles of ethylene oxide as a pale amber colored liquid which contained 2.40 meq./g. of primary amino nitrogen. No secondary or tertiary amino nitrogen could be detected.

*Example 18*

To the autoclave was added 200 g. of the 2-cyanoethyl ether of the adduct of nonylphenol with 4 moles of ethylene oxide, 250 g. of 28 percent $NH_4OH$, 16 g. of 5 percent Ru/C catalyst. The hydrogenation was carried out at 1000–1400 p.s.i.g. at 125° C. Hydrogenation was complete in about 10 minutes. The reaction product, after filtration and removal of solvent, was the 3-aminopropyl ether of the adduct of nonylphenol with 4 moles of ethylene oxide as an amber colored oil weighing 189 g., containing 1.89 meq./g. of primary amino nitrogen. No secondary or tertiary amino nitrogen could be detected.

*Example 19*

To the autoclave was charged 200 g. of the 2-cyanoethyl ether of the adduct of nonylphenol with 9 moles of ethylene oxide, 200 ml. of dry methanol, 51 g. of liquid ammonia and 10 g. of 5 percent Ru/C catalyst. Hydrogenation was carried out at 125° C. and 1000–1550 p.s.i.g. The reduction was complete in less than 10 minutes. Filtration of the product and removal of the volatile material yielded 187 g. of the 3-aminopropyl ether of the adduct of nonylphenol with 9 moles of ethylene oxide as a pale yellow, somewhat cloudy liquid, containing 1.29 meq./g. of primary amino nitrogen. No secondary or tertiary amine could be detected.

*Example 20*

To the autoclave was added 200 g. of the 2-cyanoethyl ether of the adduct of nonylphenol with 20 moles of ethylene oxide, 200 ml. of dry methanol, 30 g. of liquid ammonia, and 7 g. of 5 percent Ru/C catalyst. Hydrogenation was carried out as before at 125° C. and 1000–1400 p.s.i.g. The reduction was completed in less than 10 minutes. Filtration and removal of the volatile material yielded 187 g. of the 3-aminopropyl ether of the adduct of nonylphenol with 20 moles of ethylene oxide as a pale yellow, somewhat viscous oil which tended to crystallize on standing, and containing 0.844 meq./g. of primary amino nitrogen. No secondary or tertiary amine was detected.

*Example 21*

To the autoclave was charged 200 g. of a cyanoethylated polyethylene oxide of general formula

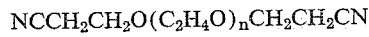
$NCCH_2CH_2O(C_2H_4O)_nCH_2CH_2CN$ average molecular weight ca. 335, which contained approximately 0.13 meq./g. of remaining OH, 20 g. of 5 percent Ru/C catalyst, and 100 g. of liquid ammonia. The hydrogenation was carried out at 75° C. over a total of 9 hours. Filtration of the product and removal of the volatile material yielded 176 g. of

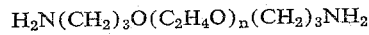
$H_2N(CH_2)_3O(C_2H_4O)_n(CH_2)_3NH_2$ average molecular weight ca. 343 as a pale amber oil containing 5.58 meq./g. of total amino nitrogen, of which 0.25 meq./g. was analyzed to be secondary and tertiary amine, and 5.33 meq./g. of primary amino nitrogen. The product also contained approximately 0.28 meq./g. of hydroxyl or an increase of 0.15 meq./g. during the hydrogenation reaction. When the reduction was carried out at 100° C., it was complete in about one hour. The product so obtained had essentially the same analysis (5.55 meq./g. of total amino nitrogen).

*Example 22*

To the autoclave was added 150 g. of a cyanoethylated adduct of glycerine and propylene oxide of general Formula I, Example 8, excepting that the average molecular weight=ca. 850 and average of $x$, $y$ and $z=3.5$, having 0.18 meq./g. of OH remaining, 20 g. of 5 percent Ru/C catalyst and 310 g. of 28 percent aqueous $NH_4OH$. The hydrogenation was carried out at 125° C. at a hydrogen pressure of 1000–1550 p.s.i.g. and was complete in less than 10 minutes. Filtration and removal of the volatile material yielded 129 g. of the corresponding tris-3-aminopropyl ether (general Formula II, Example 8, average of $x$, $y$ and $z=3.5$) as a light amber oil containing 3.10 meq./g. of total amino nitrogen by titration, of which 2.97 meq./g. was primary amino nitrogen and 0.13 meq./g. was secondary and tertiary amino nitrogen. The material was also estimated (by difference) to contain 0.38 meq./g. of OH.

*Example 23*

To the autoclave was charged 200 g. of a cyanoethylated polyethylene oxide of formula

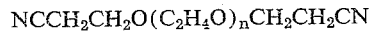
$NCCH_2CH_2O(C_2H_4O)_nCH_2CH_2CN$ having an average molecular weight of about 1170 and a residual OH of 0.05 meq./g., 250 g. of 28 percent ammonium hydroxide and 15 g. of 5 percent Ru/C catalyst. The hydrogenation was carried out at 100° C. over a period of one hour, and 1000–1500 p.s.i.g. Filtration of the product and removal of volatile material yielded 184 g. of

$H_2N(CH_2)_3O(C_2H_4O)_n(CH_2)_3NH_2$ having an average molecular weight of ca. 1178 as a pale yellow oil which had a total of 1.53 meq./g. of total amine by titration and 1.49 meq./g. of primary amine, leaving a total of 0.04 meq./g. maximum secondary plus tertiary amine.

*Example 24*

To the autoclave was added 200 g. of a cyanoethylated polyethylene oxide of formula

$NCCH_2CH_2O(C_2H_4O)_nCH_2CH_2CN$ having an average molecular weight of ca. 2160, and 7.6 g. of 5 percent Ru/C catalyst. No ammonia or ammonium hydroxide was added. The hydrogenation was carried out at 125° C. at 1000–1350 p.s.i.g. Reduction was complete in about 30 minutes. Filtration and removal of the volatile material yielded 189 g. of the corresponding bis-3-aminopropyl ether,

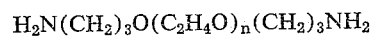
$H_2N(CH_2)_3O(C_2H_4O)_n(CH_2)_3NH_2$ having an average molecular weight of ca. 2168 as a white crystalline solid containing 0.83 meq./g. of total amine by titration. Analysis showed the presence of 0.09 meq./g. of secondary plus tertiary amines and therefore the total primary amine content was about 0.74 meq./g. When the reduction was carried out in identical fashion excepting that the charge was 170 g. of a bis-2-cyanoethyl ether of a polyethylene glycol having a molecular weight of ca. 2160, 150 ml. of dry methanol, 25 g. of liquid ammonia and 15 g. of 5 percent Ru/C catalyst, the product was 155 g. of white waxy solid which contained 0.75 meq./g. of total amine by titration and 0.0013 meq./g. of secondary and tertiary amine. When the reduction was repeated using 200 g. of the preceding bis-2-cyanoethyl ether, 116 g. of aqueous ammonium hydroxide, and 7.6 g. of 5 percent Ru/C catalyst in the same manner the product was 171 g. of white crystalline product containing 0.77 meq./g. of total amino nitrogen, and 0.02 meq./g. of secondary plus tertiary amine.

*Example 25*

To the autoclave was added 200 g. of $$NC(CH_2)_2O(C_4H_8O)_3(CH_2)_2CN$$

100 ml. of dry methanol, 85 g. of liquid ammonia and 10 g. of 5 percent Ru/C catalyst. The hydrogenation was carried out at 125° C. and 1000–1500 p.s.i.g. and was complete in about 30 minutes. Workup as in previous examples gave 191 g. of $$H_2N(CH_2)_3O(C_4H_8O)_3(CH_2)_3NH_2$$

containing 4.25 meq./g. of amino nitrogen.

*Example 26*

To the autoclave was added 200 g. of $$NC(CH_2)_2O(C_4H_8O)_7(CH_2)_2CN$$

100 ml. dry methanol, 100 g. of liquid ammonia and 13 g. of 5 percent Ru/C catalyst. After hydrogenation as above, there was obtained 189 g. of $$H_2N(CH_2)_3O(C_4H_8O)_7(CH_2)_3NH_2$$

containing 3.12 meq./g. of amino nitrogen.

*Example 27*

To the autoclave was added 250 g. of $$NC(CH_2)_2O(C_4H_8O)_{14}(CH_2)_2CN$$

100 ml. of dry methanol, 50 g. of liquid ammonia and 10 g. of 5 percent Ru/C catalyst. Hydrogenation was carried out as in previous examples at 125° C. and 1000–1800 p.s.i.g., and was complete in less than 30 minutes. Workup as before yielded 227 g. of $$H_2N(CH_2)_3O(C_4H_8O)_{14}(CH_2)_3NH_2$$

as a viscous oil containing 0.774 meq./g. of primary amino nitrogen.

What is claimed is:

1. Method for making primary amines from nitriles which comprises hydrogenating a nitrile to its corresponding primary amine at a temperature between 0° and 200° C. and a pressure between 500 and 2000 p.s.i.g. wherein the reaction is carried out in the presence of at least 5 moles of ammonia per equivalent of nitrile and a catalytic amount of ruthenium.

2. Method of claim 1 wherein the nitrile is in a concentration up to one normal solution in an inert solvent.

3. Method of claim 1 wherein a proportion of at least 2 moles of hydrogen, 0.01–50 grams ruthenium catalyst and 5–20 moles ammonia per equivalent of nitrile group are used at a reaction temperature between 50° and 150° C.

4. Method of claim 3 wherein the nitrile is 3-alkoxy-propionitrile.

5. Method of claim 3 wherein the nitrile is a tris-(2-cyanoethyl)ether having the formula $$H_2C-O-(C_3H_6O)_x-CH_2CH_2CN$$
$$HC-O-(C_3H_6O)_y-CH_2CH_2CN$$
$$H_2C-O-(C_3H_6O)_z-CH_2CH_2CN$$

and an average molecular weight of 425, and wherein $x$, $y$ and $z$ have an average value of 1.

6. Method of claim 3 wherein the nitrile is a cyanoethylated polyoxypropylene glycol having the general formula $$NCCH_2CH_2O(C_3H_6O)_nCH_2CH_2CN$$

wherein $n$ is integer such that the average molecular weight is 506 to 2,136.

7. Method of claim 3 wherein the nitrile is a cyanoethylated polyethylene oxide adduct of methanol having the formula $$CH_3O(C_2H_4O)_{12}CH_2CH_2CN$$

and an average molecular weight of about 613.

8. Method of claim 3 wherein the nitrile is a cyanoethylated polypropylene oxide adduct of methanol having the formula $$CH_3O(C_3H_6O)_nCH_2CH_2CN$$

and an average molecular weight of 640, and wherein $n$ has an average value of 9.5.

9. Method of claim 3 wherein the nitrile is 2-(2-(tert.-octylphenoxy)ethoxy)propionitrile.

10. Method of claim 3 wherein the nitrile is the 2-cyanoethyl ether of an adduct of nonylphenol with 2 to 20 moles of ethylene oxide.

11. Method of claim 3 wherein the nitrile is a cyanoethylated polyethylene oxide having the formula $$NCCH_2CH_2O(C_2H_4O)_nCH_2CH_2CN$$

and an average molecular weight of about 2,160.

12. Method of claim 3 wherein the nitrile is a cyanoethylated polyglycol.

13. Method of claim 3 wherein the nitrile is a cyanoethylated polyglycol monoether.

14. Method of claim 3 wherein the nitrile is a compound of the formula $$RX(C_aH_{2a}O)_n(CH_2)_yCN$$

wherein R is hydrocarbyl, X is chosen from the group consisting of O and NR' wherein R' is chosen from the group consisting of H, R, $-(C_aH_{2a}O)_nR$, and $$-(C_aH_{2a}O)_n(CH_2)_yCN$$

wherein each $y$ is an integer from 1 to 3, each $n$ is an integer from 0 to about 100 and $a$ is an integer from 2 to 4.

15. Method of claim 3 wherein the nitrile is a cyanoethylated polyoxybutylene glycol having the formula $$NC(CH_2)_2O(C_4H_8O)_n(CH_2)_2CN$$

wherein $n$ is 3 to 14.

References Cited

UNITED STATES PATENTS

| | | | |
|---|---|---|---|
| 2,690,456 | 9/1954 | Renfrew et al. | 260—583 |
| 3,061,644 | 10/1962 | Fierce et al. | 260—583 |
| 3,117,162 | 1/1964 | Rylander et al. | 260—583 |
| 3,238,277 | 3/1966 | Sigan et al. | 260—583 X |

CHARLES B. PARKER, *Primary Examiner.*

R. L. RAYMOND, *Assistant Examiner.*